US006413426B1

(12) United States Patent
DeBusk et al.

(10) Patent No.: US 6,413,426 B1
(45) Date of Patent: Jul. 2, 2002

(54) ALGAL AND NUTRIENT CONTROL SYSTEM AND METHOD FOR A BODY OF WATER

(76) Inventors: Thomas A. DeBusk, 3208 Westchester Dr.; David L. Haselow, 2825 Friday La., both of Cocoa, FL (US) 32926

( * ) Notice: Subject to any disclaimer, the term of this patent is extended or adjusted under 35 U.S.C. 154(b) by 0 days.

(21) Appl. No.: 09/929,970

(22) Filed: Aug. 15, 2001

Related U.S. Application Data

(60) Provisional application No. 60/227,559, filed on Aug. 23, 2000.

(51) Int. Cl.[7] .................................................. C02F 3/00

(52) U.S. Cl. ...................... 210/602; 210/702; 210/723; 210/790; 210/242.1

(58) Field of Search ................................ 210/602, 702, 210/723, 790, 242.1

(56) References Cited

U.S. PATENT DOCUMENTS 5,766,474 A    6/1998  Smith et al.

OTHER PUBLICATIONS

Lake Apopka Water Hyacinth Demonstration Project, Second Semi–Annual Report prepared for St. Johns River Water Management District, prepared by Amasek, Inc., Apr. 4, 1991.

*Primary Examiner*—Chester T. Barry
(74) *Attorney, Agent, or Firm*—Allen, Dyer, Doppelt, Milbrath & Gilchrist, P.A.

(57) ABSTRACT

A system to control nutrients, suspended algae, and filamentous algae in lakes, ponds, and estuaries includes a structure for containing macrophytic vegetation. One embodiment segregates a column of water within a body of water desired for remediation and shields the water column from sunlight sufficiently to kill phytoplankton therein, the lysis thereof releasing nutrients. The released nutrients are sequestered, and remediated water is replaced in the water column with water from the body of water. Floating or submerged macrophytes can be introduced in combination with shading and induced water movement to optimize nutrient uptake by the macrophytes. Water column shading may also be achieved by the macrophytes themselves, or by other means. The macrophytes can include floating aquatic plants, such as water hyacinths, submerged aquatic plants, by and terrestrial or aquatic plants caused to float artificially. The invention also deals with toxic algae in a safe and sequestered way.

33 Claims, 5 Drawing Sheets

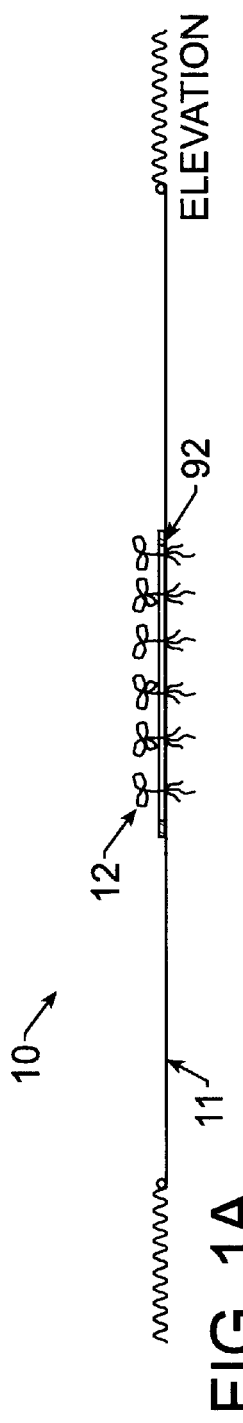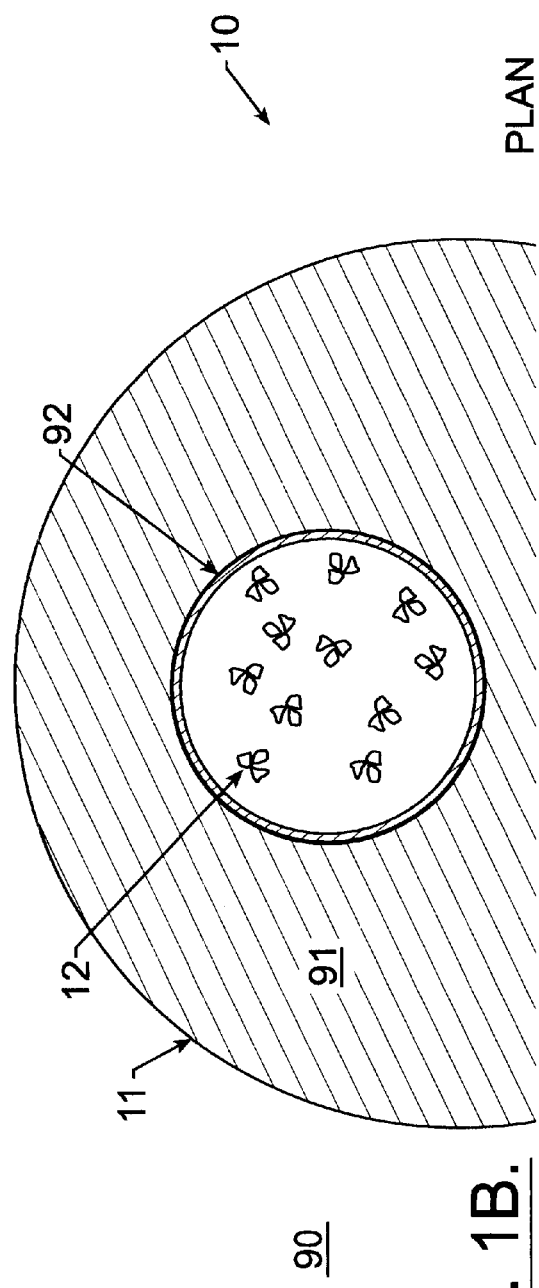

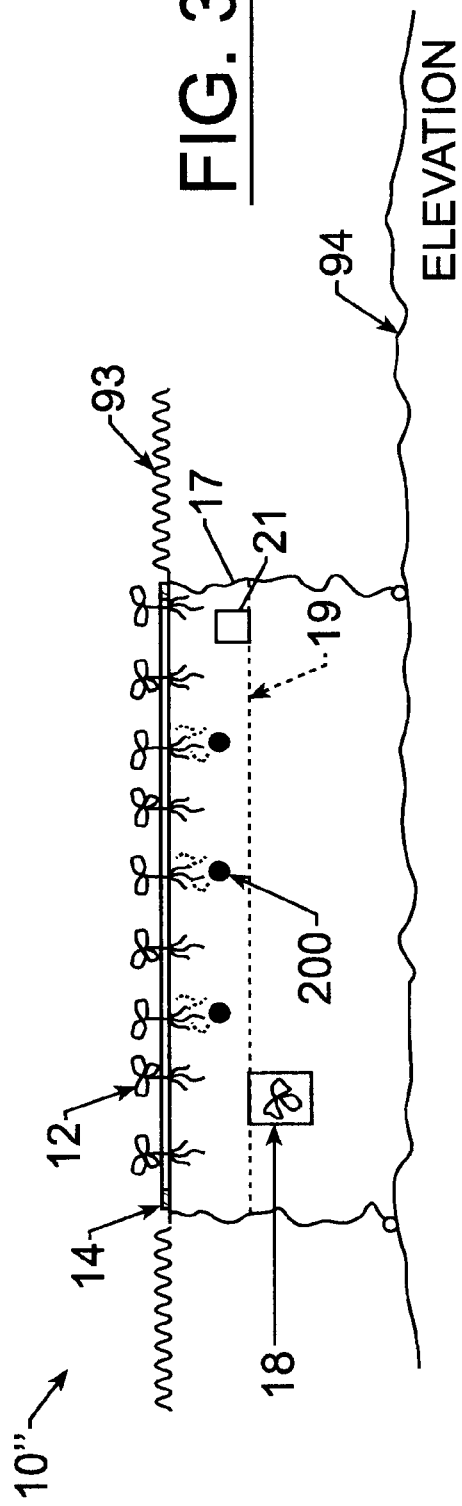
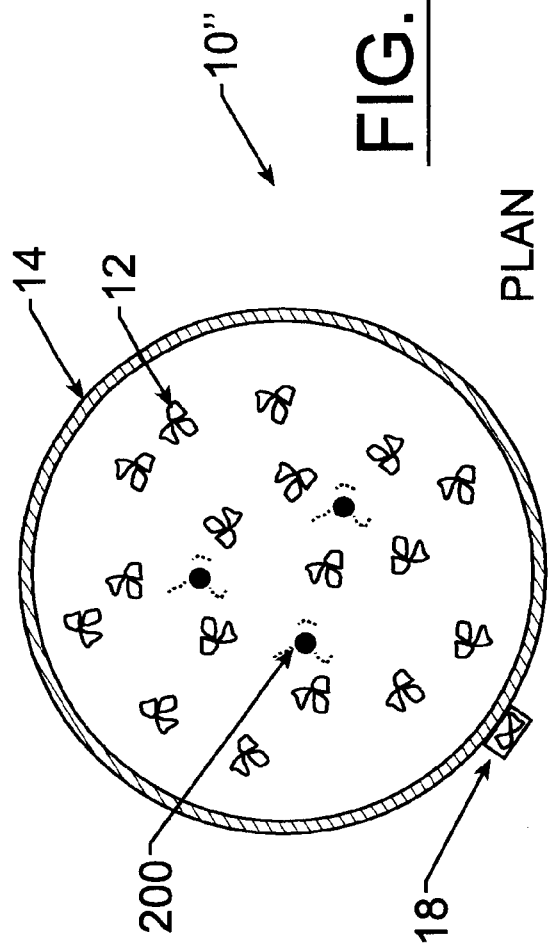

ALGAL AND NUTRIENT CONTROL SYSTEM AND METHOD FOR A BODY OF WATER

CROSS-REFERENCE TO RELATED APPLICATION

This application claims priority from provisional application Ser. No. 60/227,559, "Macrophyte System and Method for Algae and Nutrient Control in a Body of Water," filed Aug. 23, 2000.

BACKGROUND OF THE INVENTION

1. Field of the Invention

The present invention relates to systems and methods of water purification, and, more particularly, the control of nutrients and suspended and filamentous algae in estuaries and fresh water bodies.

2. Description of Related Art

Many freshwater lakes and ponds, as well as estuaries, are characterized, particularly during the warmer months, by a significant population of suspended algae or phytoplankton in the water body's water column. These largely unicellular plants give the water a greenish and often a "pea-soup" appearance that many observers find unattractive. Floating mats of unsightly, filamentous algae also can occur. High concentrations of algae may lead to low levels of dissolved oxygen in the early morning hours, leading to stress on the aquatic and fish populations. In extreme cases, these conditions will lead to fish kills and the general decline of the quality of a water body.

The basis of the problem is an abundance of soluble nutrients within the water body, which then allows the rapid growth and maintenance of the elevated population of suspended or filamentous algae. The source of the soluble nutrients may be sediments, air deposition, point source polluting discharges, generalized, non-point-source inflows, or most likely a combination of all these factors. An effective management strategy would combine elements of attempting to reduce nutrient loading to the water body with treatment of the water body itself.

Currently used methods of controlling algal growth in ponds or lakes typically involve treating the water with selected herbicides or "algicides." These chemicals kill the suspended algae, returning the water to its more desired appearance of clear or only slightly colored waters. Alternatively, a water body may be treated with various aluminum salts (e.g., aluminum sulfate), which achieves a similar result through a chemical precipitation reaction. Another strategy employed in managing algae is to introduce a dye that then, via the mechanism of shading, achieves the same result of killing the algae and returning the water to its algae-free appearance.

Another problem with these approaches is that the underlying feature that initially encouraged the growth of the algae remains; that is, the nutrients on which the algae grew remain in the water, and after the effects of the algicide, herbicide, or dye decrease, the conditions for a renewed growth of algae are abundantly present. In addition, for the algicide and herbicide at least, the negative environmental effects of potentially toxic accumulation must be considered. In the case of aluminum salts, a temporary reduction in selected nutrients (e.g., phosphorus) is effected, but considerable skill and expertise are required to effectively and efficiently precipitate the suspended (nutrient-containing) solids.

An alternative strategy to killing the algae and then creating relatively clear but nutrient-rich water body is to cause a release of nutrients from the algae but then to remove these nutrients from the water body. A natural method of achieving this nutrient removal is through the harvesting of macrophyte vegetation, which takes up the soluble nutrients as a function of their growth. If the total mass of nutrients removed through plant harvest were to match the ongoing nutrient loading through the various sources of sediment transport, air deposition point and nonpoint sources, then the lake or pond would be able to maintain an algal-free appearance.

In U.S. Pat. No. 4,888,912, a system of growing and harvesting aquatic plants is described. In it, an "envelope," made of a plastic material permeable to light, air, and water, contains certain plants (typically submerged macrophytes), which then grow and assimilate soluble nutrients. Because the plants are contained in the envelope, harvesting is convenient and the plants are prevented from escaping into the larger water body.

The ability of the plants within the envelope to grow, and hence reduce the population of algae depends on a complex ecological competition between the introduced species of macrophyte vegetation and the existing algae in the water body. The nutrients contained in the healthy algal biomass are normally bound up in cellular constituents—that is, not biologically available for other plants' growth. The introduced plant species must then effect a decrease in the standing crop of algae, thereby creating an increase in the amount of nutrients bioavailable for the introduced species. Therefore, using introduced macrophytes to decrease ambient soluble nutrient levels and algae populations is necessarily a two-step process. First, the nutrients bound up in the algal biomass must be released and become bioavailable. Second, the soluble nutrients must then be incorporated into a standing crop amenable to periodic harvesting. The harvesting effectively removes the nutrients from the water body.

Shading of the suspended algae-containing water is one means to achieve algal cell lysis and an increase in the proportion of nitrogen and phosphorus in the water column that is biologically available for other plant growth. The use of shading to cause a release of soluble nutrients has been investigated and taken advantage of in the prior art. In U.S. Pat. Nos. 5,096,577, 5,180,501, 5,264,127, 5,342,512, and 5,409,601 (all assigned to the Lemna Corp.), a floating or submerged aquatic plant is used to cover and shade a wastewater beneath.

Reddy and DeBusk (1987) determined in a short-term mesocosm-scale experiment that the primary nutrient removal mechanism in a water hyacinth system that received phytoplankton-laden lake water was the settling of algal cells.

In U.S. Pat. No. 4,042,367 the introduction of a colored dye is used to prevent the transmission of photosynthetically active radiation through a water column. In turn, this action prevents photosynthesis and thereby controls the growth of algae.

The Florida company Amasek, Inc., working on Lake Apopka and Round Lake in Florida in the late 1980s and early 1990s, grew water hyacinths within the confines of in situ boom and barrier systems. Through the process of water shading, the hyacinths were able to outcompete the suspended algae through algal lysis, nutrient release, and subsequent uptake by the hyacinths.

The sustainable removal of nutrients, however, involves not just shading and subsequent plant uptake and plant harvest. Many macrophytes, such as the floating water hyacinths or submerged macrophytes, are characterized by much higher growth rates than can be adequately sustained by the amount of nutrients held by a water column beneath them. Reddy et al. (1983) concluded that the high levels of floating water hyacinth biomass in a central Florida lake could be sustained only by transport of nutrients from the sediments and detritus or by fixation (in the case of nitrogen) from the atmosphere.

A particular model of a system for decreasing algal concentration consists of macrophyte vegetation (plants) and various permutations of floating boom, barrier, and water control mechanisms (pumps, internal barriers, etc.) for sequentially shading suspended algae-containing water. The shading causes the algae to lyse and release contained nutrients, which then promotes the growth of a standing crop of either subsurface (submerged) or floating vegetation. Depending on the configuration desired, the plants are periodically harvested from the containment system, effectively removing soluble nutrients such as phosphorus and nitrogen from the pond, estuary, or lake. In the case of submerged macrophytes, water chemistry changes caused by their photosynthetic activity can further contribute to nutrient removal (e.g., co-precipitation of phosphorus with calcium carbonate) beyond that achieved by plant harvest. As the overall total level of nutrients within the water column decreases, the conditions favorable to sustained nuisance algal growth diminish, and further algal growth is discouraged.

Therefore, to encourage further plant growth and hence continued removal of suspended and filamentous algae, it is believed desirable that the water beneath the macrophyte vegetation, whether held within a barrier or not, be exchanged with new nutrient-bearing water.

SUMMARY OF THE INVENTION

It is therefore an object of the present invention to provide a system and method for water bioremediation.

It is another object to provide such a system and method that employs in situ macrophytes to control nutrient concentration.

It is an additional object to provide such a system and method that avoids the use of toxic additives to the water to be remediated.

It is a further object to provide such a system and method that removes toxic algae without releasing the toxins into the body of water.

These and other objects are achieved by the system and method of the present invention, which is directed to the management and control of suspended and filamentous algae and excess nutrients in fresh water bodies and estuaries. A plurality of embodiments are contemplated, a best mode among which is dependent upon the characteristics of each specific body of water, as determinable by measurements of water chemistry and algal decomposition rates.

One embodiment is a method comprising the steps of segregating a column of water within a body of water having excess phytoplankton and nutrients therein and shielding the water column from sunlight sufficiently to kill phytoplankton therein, the lysis thereof releasing nutrients. Next the released nutrients are sequestered, and remediated water is replaced in the water column with water from the body of water.

In some embodiments, floating or submerged macrophytes are introduced into a body of water in combination with water column shading and induced water movement to optimize nutrient uptake by the macrophytes. Water column shading may also be achieved by the macrophytes themselves. The macrophytes can include aquatic plants that float on their own, such as water hyacinths, submerged aquatic plants, and terrestrial or aquatic plants caused to float by artificial means.

Another developing problem in bodies of fresh water is the presence of toxic algae. At present copper is added to the water to kill the toxic algae, but the difficulty is that this releases the toxins into the water.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIGS. 1A and 1B are, respectively, elevation and top plan views of a first embodiment of the system of the present invention.

FIGS. 3A and 3B are, respectively, elevation and top plan views of a third embodiment of the system.

DETAILED DESCRIPTION OF THE PREFERRED EMBODIMENTS

Figure 2A:
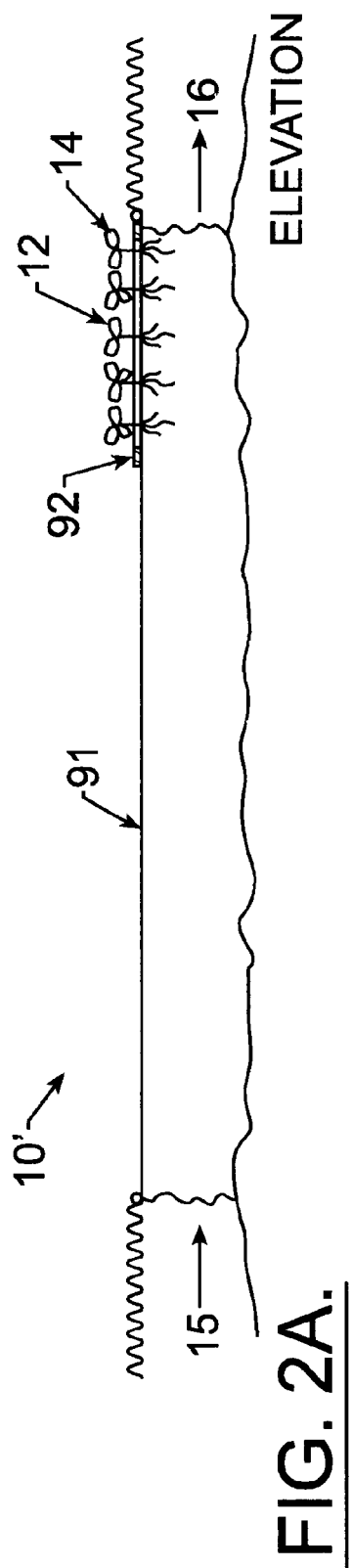
FIGS. 2A and 2B are, respectively, elevation and top plan views of a second embodiment of the system.
Figure 2B:
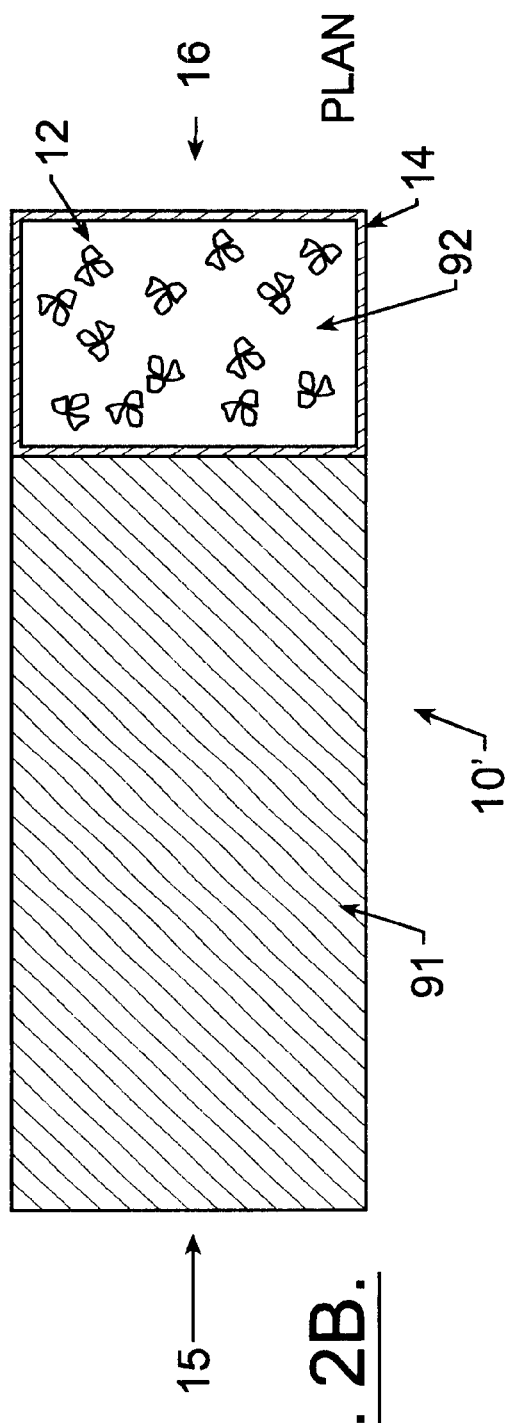

A description of the preferred embodiments of the present invention will now be presented with reference to FIGS. 1–4B.

In a first embodiment (FIGS. 1A and 1B), the system 10 comprises means for shading 11 a first section 91 of a body of water 90. The shading means may comprise, for example, floating balls, shade cloth, or opaque fabric, etc., although these are not intended as a limitation. A second section 92 of the body of water 90 contains macrophytes 12. The macrophytes 12 may comprise either or both of a floating or submerged variety. In this embodiment the first section 91 is larger than the second section 92.

In one configuration, the shaded area 91 is equicentric with boomed floating or submerged plants 12, providing for a detention time by the water under the shading and subsequent detention time in the proximity of the floating or submerged plants 12. In this way, as the water moves under the shade 11, it is shaded and subsequently the nutrients released by dying algae are taken up by the macrophytes 12.

In a second embodiment 10' (FIGS. 2A and 2B), a floating boom 14 containing macrophytes 12 is not circular but instead rectangular, wherein the water enters one end 15, is shaded (causing nutrient release) under the shaded area 91, and then moves into the area 92 containing the macrophytes 12, and exits the other end 16.

In a third embodiment 10" (FIGS. 3A and 3B), a barrier 17 extends from the surface 93 to the bottom 94 and is affixed to a floating boom 14 containing the macrophytes 12. Means are provided for controlling the ingress and egress of water to this now-separated water column. The control of the water exchange can be effected by a pump 18, deployed under the water surface 93 and adjacent the barrier 17. The egress of the water is effected by the pressure differential created by the ingress pump 18 and is made through an egress vent 21 in another portion of the barrier 17.

In this embodiment, in which the barrier 17 extends from the floating boom 14 to the bottom 94 is used, an internal structure or baffle 19 adapted to cause serpentine flow patterns within the barrier structure 17 is used. Such a structure has no appreciable effect on the detention time of the enclosed water (which would be determined by the pumping rate at the ingress structure), but is believed to serve to enhance settling of suspended algae by creating zones of lower water velocities.

A fourth embodiment and subembodiments thereof (FIGS. 4A and 4B) is believed at present to represent the best mode of practicing the invention. In this embodiment, a system and method for reducing a population of phytoplankton 20 and excess nutrient level in a body of water 32 comprises means for segregating a column of water 31 within the body of water 32 having excess phytoplankton 20 and nutrients therein. In one subembodiment 30 the segregating means comprises an enclosure 33 extending from a surface 93 to a bottom 94 of the body of water 32, as, for example, in FIGS. 4A and 4B. Although this embodiment 30 is shown as substantially cylindrical, this is not intended as a limitation, and other shapes may be contemplated within the scope of the present invention. The enclosure 33 comprises a material impermeable to water passage and has floats 34 attached to a top edge 35 of the enclosure 33 on the water body surface 93 and further has weights 36 attached to a bottom edge 37 for retaining the bottom edge 37 adjacent the water body bottom 94.

Figure 4A:
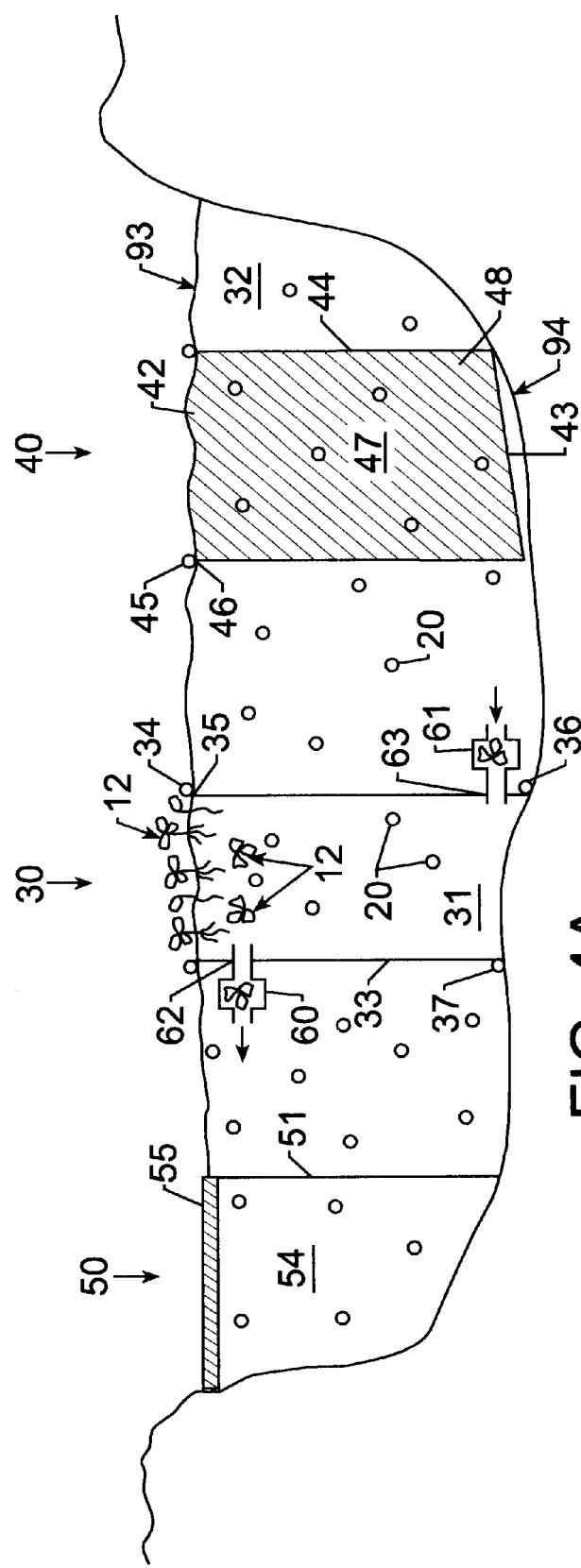
FIGS. 4A and 4B represent several embodiments of a fourth embodiment of the system, with FIGS. 4A and 4B illustrating cross-sectional and plan views, respectively, of systems having a single wall enclosure in the body of water, an enclosure having an enclosed bottom, and a partition separating out the water column from a portion of the shore.
Figure 4B:
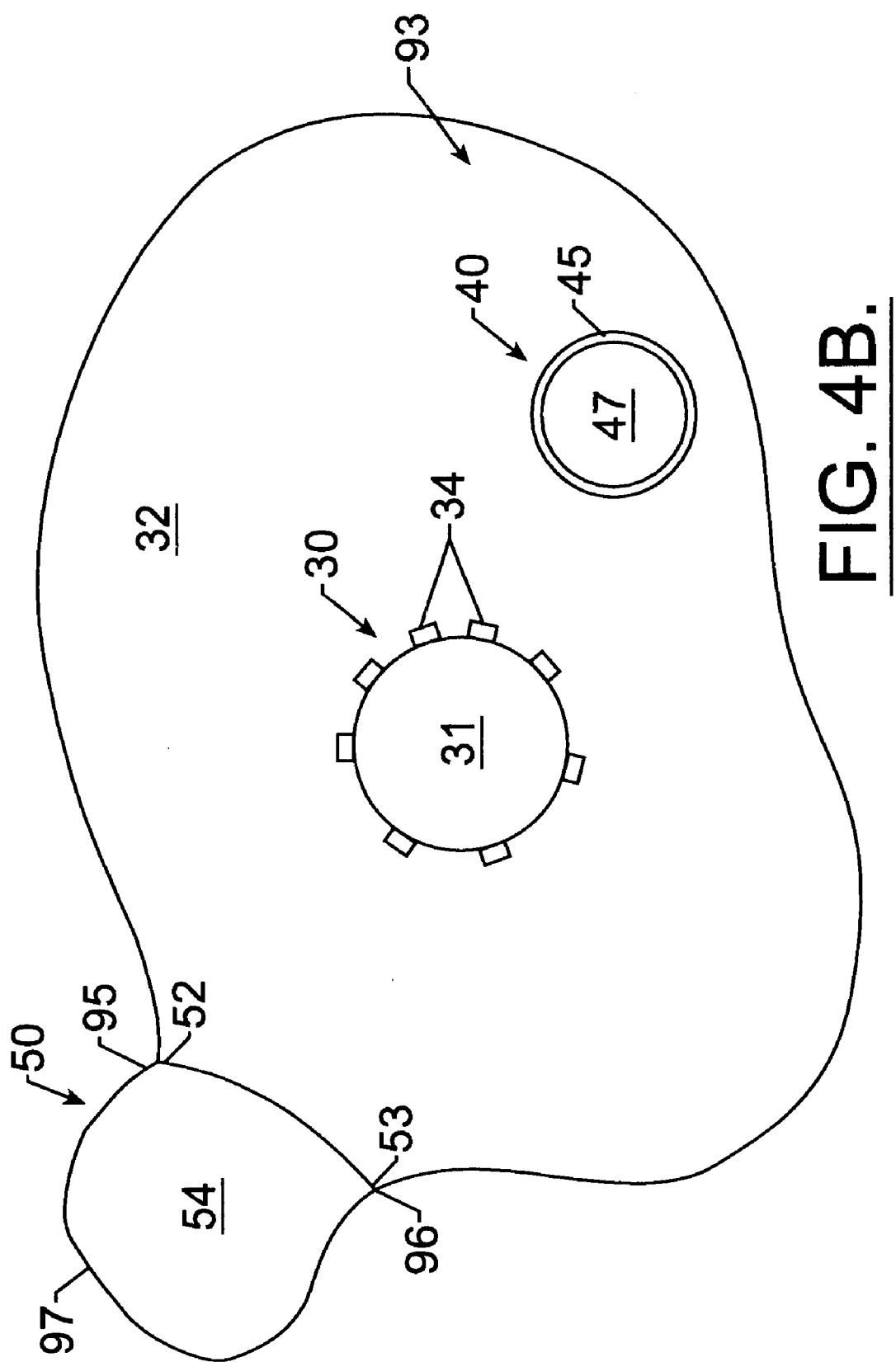

In a second subembodiment 40, also shown in FIGS. 4A and 4B, the segregating means comprises a water-impervious enclosure 41 that is insertable into the water body 32. The enclosure 41 comprises an open top 42, an enclosed bottom 43, a wall 44 affixed to the bottom 43 and extending upwardly therefrom, and a float 45 attached to a top edge 46 of the wall 44. The enclosure 41 therefore creates a water column 47 therewithin.

In a third subembodiment 50, also shown in FIGS. 4A and 4B, the segregating means comprises a partition that is droppable from the surface 93 to the bottom 94 of the body of water 32. The partition comprises a wall 51 that extends laterally from a first edge 52 that is anchorable against a first location 95 along an edge of the water body 32 and a second edge 53 that is anchorable against a second location 96 along the water body's edge in spaced relation from the first location 95. This partition 51 thereby creates a water column 54 that is enclosed by the partition wall 51 and the water body edge 97 between the first 95 and the second 96 location.

In an alternate embodiment to the third subembodiment 50, particularly useful in a shallow body of water or a shallow portion of a body of water, the partition comprises a row of tall and deeply extending plants, such as a row of bullrushes or cattails, which will hold the macrophytes in place and substantially prevent rapid water exchange therethrough.

The system further comprises a cover for shielding at least a portion of the water column from sunlight, for killing phytoplankton 20 therein, which need sunlight to survive.

Killing the phytoplankton 20 is believed to be a requirement for excess nutrient removal, since the phytoplankton 20 typically outcompete the macrophytes 12 for the nutrients in the water. The lysis of the phytoplankton 20 releases nutrients therefrom. In the first subembodiment 30, the cover comprises a plurality of floating or submerged macrophytes 12 placed within the water column 31. The macrophytes, as described above, have an ability to take up released nutrients from the lysed phytoplankton. This subembodiment further comprises means for periodically harvesting the macrophytes 12 to reduce an excess population thereof. Such harvesting means are well known in the art, and may comprise commercial harvesting devices, for example.

In the second subembodiment 40, the cover comprises a sunlight-reducing dye 48 addable into the water column 47.

In the third subembodiment 50, the cover comprises a mixture 55 comprising a sunlight-reducing dye and a liquid immiscible with and lighter than water, the mixture floatable atop the water column 54. In other embodiments, the cover comprises a shading material 11 such as shown in FIGS. 1A and 1B that is placeable atop at least a portion of the water column.

The system additionally comprises means for sequestering the released nutrients, which in the first subembodiment comprises the macrophytes, floating 12 or submerged 12'.

Finally, the system comprises means for replacing remediated water in the water column with water from the body of water. Typically the remediated water replacing means comprises a pump for removing water from the water column and for adding water from the water body into the water column. Preferably, as shown in FIG. 4A for the first subembodiment 30, the pump comprises a first pump 60 that is positioned at a first location 62 in the enclosure 33. The first pump 60 is for removing water from the water column 31 and returning the remediated water into the water body 32. A second pump 61 is for adding water into the water column 31 from the water body 32. The second pump 61 is positioned at a second location 63 in the enclosure 33 that is lower along the water column 31 than the first location 62. Further, the first pump 60 is in laterally spaced relation from the second pump 61. Preferably the first 60 and the second 61 pumps have a pumping rate adapted to effect a steady-state between water remediation and addition of water from the water body 32. One of skill in the art will recognize that each body of water and its components will have its own characteristics, and that the phytoplankton kill rate may vary over as much as an order of magnitude from site to site, and also depending on the amount and quality of shading, and the size and depth of the water column.

The system in other embodiments may also further comprise a coagulant that can be added to the water column to compact lysed phytoplankton at a bottom of the water column. The coagulant may comprise, for example, an aluminum compound such as aluminum chloride, which also sequesters phosphorus in the water column.

The system may also comprise means for removing lysed phytoplankton from the water column, such as a pump for removing a viscous bottom layer from the water column.

It should be noted that the fourth embodiments of the invention are ideally suited for removing toxic algae without exposing the rest of the body of water to released toxins, since the toxins remain in the water column and are not released into the water body as a whole. A copper compound can be used as known in the art, also without exposing the water body as a whole to the copper.

In all embodiments means for providing aeration may be included. Aeration may be introduced, for example, via one or more fine diffusers 200 (e.g., large air stones) that are deployed at various depths and locations within the system. The purpose of the aeration is to encourage lateral and vertical mixing (as constrained by the other goal of allowing algal biomass settling), and under certain circumstances, to encourage (accelerate) decomposition of the settled algal particles.

In another alternate embodiment an electron acceptor other than oxygen (such as sulfate) to encourage algal decomposition (and nutrient release). Additionally or alternatively, electron donors may be added, such as organic matter, to the bottom of an enclosure to create oxidation-reduction conditions amenable to nutrient release.

In the embodiment 10″ of FIGS. 3A and 3B, means may also be provided for exposing the algae in the pumped "ingress" water to some sort of physical or chemical perturbation to accelerate their lysis and nutrient release within the enclosure.

It may be appreciated by one skilled in the art that additional embodiments may be contemplated.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

REFERENCES

Reddy, K. R.; Rao, P. S. C., DeBusk, W. F. "Waterhyacinth Production Systems in Nutrient Enriched Waters, Project 2161," (Sep. 13, 1983), GRI/IFAS Project Advisors Review Meeting, University of Florida, Gainesville.

Amasek, Inc., "Lake Apopka Water Hyacinth Demonstration Project, Semi-Annual Report May–October 1989," (Jan. 29, 1990), Amasek, Inc., Cocoa, Fla., prepared for St. Johns River Water Management District, Palatka, Fla.

Reddy, K. R., DeBusk, T. A., "State-of-the-Art Utilization of Aquatic Plants in Water Pollution Control," Wat. Sci. Tech. Vol. 19 No. 10 pp.61–79, 1987.

What is claimed is:

1. A method for reducing a population of phytoplankton and excess nutrient level in a body of water comprising the steps of:
   segregating a column of water within a body of water having excess phytoplankton and nutrients therein;
   shielding the water column from sunlight sufficiently to kill phytoplankton therein, the lysis thereof releasing nutrients;
   sequestering the released nutrients; and
   replacing remediated water in the water column with water from the body of by water.

2. The method recited in claim 1, wherein the segregating step comprises dropping an enclosure from a surface to a bottom of the body of water, the enclosure comprising a material impermeable to water passage and having means for floating a top edge of the enclosure on the water body surface and further having weighting means for retaining a bottom edge adjacent the water body bottom.

3. The method recited in claim 1, wherein the segregating step comprises inserting a water-impervious enclosure into the water body, the enclosure comprising an open top, a bottom, a wall affixed to the bottom and extending upwardly therefrom, and a floating means attached a top edge of the wall.

4. The method recited in claim 1, wherein the segregating step comprises dropping a partition from a surface to a bottom of the body of water, the partition comprising a wall having a first edge anchorable against a first location along an edge of the water body and a second edge anchorable against a second location along the water body edge in spaced relation from the first location, thereby creating an water column enclosed by the partition and the water body edge between the first and the second location.

5. The method recited in claim 1, wherein the shielding and the sequestering steps comprise placing floating or submerged macrophytes within the water column, the macrophytes having an ability to take up released nutrients.

6. The method recited in claim 5, further comprising the step of periodically harvesting the macrophytes to reduce an excess population thereof.

7. The method recited in claim 1, wherein the shielding step comprises adding a sunlight-reducing dye into the water column.

8. The method recited in claim 1, wherein the shielding step comprises mixing a sunlight-reducing dye into a liquid immiscible with and lighter than water and floating the dye-liquid mixture atop the water column.

9. The method recited in claim 1, wherein the shielding step comprises placing a shading material atop at least a portion of the water column.

10. The method recited in claim 1, wherein the remediated water replacing step comprises pumping water out of the water column and pumping water from the water body into the water column.

11. The method recited in claim 10, wherein the pumping steps comprise effecting a steady-state between water remediation and addition of water from the water body.

12. The method recited in claim 1, further comprising the step of adding a coagulant to the water column to compact lysed phytoplankton at a bottom of the water column.

13. The method recited in claim 12, wherein the coagulant comprises an aluminum compound.

14. The method recited in claim 12, wherein the coagulant-adding step further comprises the step of sequestering phosphorus in the water column.

15. The method recited in claim 1, further comprising the step of removing lysed phytoplankton from the water column.

16. The method recited in claim 15, wherein the phytoplankton-removing step comprises pumping out a viscous bottom layer of the water column.

17. A system for reducing a population of phytoplankton and excess nutrient level in a body of water comprising:
   means for segregating a column of water within a body of water having excess phytoplankton and nutrients therein;
   a cover for shielding at least a portion of the water column from sunlight, for killing phytoplankton therein, the lysis thereof releasing nutrients;
   means for sequestering the released nutrients; and
   means for replacing remediated water in the water column with water from the body of water.

18. The system recited in claim 17, wherein the segregating means comprises an enclosure extending from a surface to a bottom of the body of water, the enclosure comprising a material impermeable to water passage and having means for floating a top edge of the enclosure on the water body surface and further having weighting means for retaining a bottom edge adjacent the water body bottom.

19. The system recited in claim 17, wherein the segregating means comprises a water-impervious enclosure insertable into the water body, the enclosure comprising an open top, a bottom, a wall affixed to the bottom and extending upwardly therefrom, and a floating means attached to a top edge of the wall.

20. The system recited in claim 17, wherein the segregating means comprises a partition comprising a wall droppable from a surface to a bottom of the body of water, the partition wall having a first edge anchorable against a first location along an edge of the water body and a second edge anchorable against a second location along the water body edge in spaced relation from the first location, thereby creating a water column enclosed by the partition and the water body edge between the first and the second location.

21. The system recited in claim 17, wherein the cover and the sequestering means comprise floating or submerged macrophytes placed within the water column, the macrophytes having an ability to take up released nutrients.

22. The system recited in claim 21, further comprising means for periodically harvesting the macrophytes to reduce an excess population thereof.

23. The system recited in claim 17, wherein the cover comprises a sunlight-reducing dye addable into the water column.

24. The system recited in claim 17, wherein the cover comprises a mixture comprising a sunlight-reducing dye and a liquid immiscible with and lighter than water, the mixture floatable atop the water column.

25. The system recited in claim 17, wherein the cover comprises a shading material placeable atop at least a portion of the water column.

26. The system recited in claim 17, wherein the remediated water replacing means comprises a pump for removing water from the water column and for adding water from the water body into the water column.

27. The system recited in claim 26, wherein the pump comprises a first pump positioned at a first location in the segregating means, the first pump for removing water from the water column, and a second pump positioned at a second location in the segregating means lower along the water column than the first location and in laterally spaced relation from the first pump, the second pump for adding water into the water column.

28. The system recited in claim 27, wherein the first and the second pumps have a pumping rate adapted to effect a steady-state between water remediation and addition of water from the water body.

29. The system recited in claim 17, further comprising a coagulant addable to the water column to compact lysed phytoplankton at a bottom of the water column.

30. The system recited in claim 29, wherein the coagulant comprises an aluminum compound.

31. The system recited in claim 30, wherein the coagulant further comprises means for sequestering phosphorus in the water column.

32. The system recited in claim 17, further comprising means for removing lysed phytoplankton from the water column.

33. The system recited in claim 32, wherein the phytoplankton-removing means comprises a pump for removing a viscous bottom layer from the water column.

* * * * *